United States Patent
Ferman et al.

(10) Patent No.: US 10,369,931 B2
(45) Date of Patent: Aug. 6, 2019

(54) QUICK RELEASE MECHANISM FOR POLE MOUNTED MIRROR

(71) Applicant: Michael Ferman, Peakhurst (AU)

(72) Inventors: Michael Ferman, Peakhurst (AU);
Oliver Clemens Robert Kratzer, Ballina (AU)

( * ) Notice: Subject to any disclaimer, the term of this patent is extended or adjusted under 35 U.S.C. 154(b) by 0 days.

(21) Appl. No.: 15/518,236

(22) PCT Filed: Dec. 10, 2015

(86) PCT No.: PCT/AU2015/000610
§ 371 (c)(1),
(2) Date: Apr. 10, 2017

(87) PCT Pub. No.: WO2016/054685
PCT Pub. Date: Apr. 14, 2016

(65) Prior Publication Data
US 2017/0253185 A1    Sep. 7, 2017

(30) Foreign Application Priority Data
Oct. 10, 2014 (AU) ................................ 2014904060

(51) Int. Cl.
*B60R 1/078* (2006.01)
*B60R 1/06* (2006.01)

(52) U.S. Cl.
CPC ............ *B60R 1/078* (2013.01); *B60R 1/0605* (2013.01)

(58) Field of Classification Search
CPC ........ B60R 1/078; B60R 1/0605; G02B 7/198

USPC ......................................... 359/871; 296/1.11
See application file for complete search history.

(56) References Cited

U.S. PATENT DOCUMENTS

| | | | | |
|---|---|---|---|---|
| 5,292,100 A * | 3/1994 | Byers | ...................... | B60R 1/078 248/480 |
| 6,491,402 B1 * | 12/2002 | Stenzel | ................. | B60R 1/0605 248/475.1 |
| 6,910,781 B2 * | 6/2005 | Spychalla | ............. | B60R 1/0605 248/479 |
| 7,073,755 B2 * | 7/2006 | Michaud | ................. | F16L 3/105 248/72 |
| 7,628,372 B2 * | 12/2009 | Norman | ................ | B60R 1/0605 248/214 |
| 8,449,126 B2 * | 5/2013 | Ferman | ................. | B60R 1/0605 248/477 |
| 9,421,912 B1 * | 8/2016 | Hu | .......................... | B60R 1/078 |
| 2004/0036000 A1 * | 2/2004 | Courbon | ............... | B60R 1/0605 248/478 |
| 2006/0098314 A1 * | 5/2006 | Ung | ....................... | B60R 1/081 359/879 |
| 2007/0091490 A1 * | 4/2007 | Shieh | ....................... | A47G 1/24 359/879 |
| 2009/0166505 A1 * | 7/2009 | Courbon | ............... | B60R 1/0605 248/478 |

(Continued)

FOREIGN PATENT DOCUMENTS

| | | | | |
|---|---|---|---|---|
| EP | 0437695 A1 * | 7/1991 | ............. | B60R 1/078 |
| GB | 449840 A * | 7/1936 | ............... | B60R 1/06 |

(Continued)

*Primary Examiner* — Frank G Font
(74) *Attorney, Agent, or Firm* — Griffin and Szipl PC

(57) ABSTRACT

A quick release mechanism for a pole mounted mirror has a base for receiving a pole. The base attaches to a mirror. The base carries a knob that when tightened, clamps the pole against the mirror.

9 Claims, 4 Drawing Sheets

(56) References Cited

U.S. PATENT DOCUMENTS

2010/0202072 A1\* 8/2010 Ferman .................... B60R 1/06
                                                              359/850
2014/0153125 A1\* 6/2014 Ebert .................... B60R 1/0615
                                                              359/877

FOREIGN PATENT DOCUMENTS

| GB | 1351350 A | * | 4/1974 | ............... B60R 1/06 |
| GB | 1399583 A | * | 7/1975 | ........... B60R 1/0605 |
| GB | 1419081 A | * | 12/1975 | ............... B60R 1/02 |

\* cited by examiner

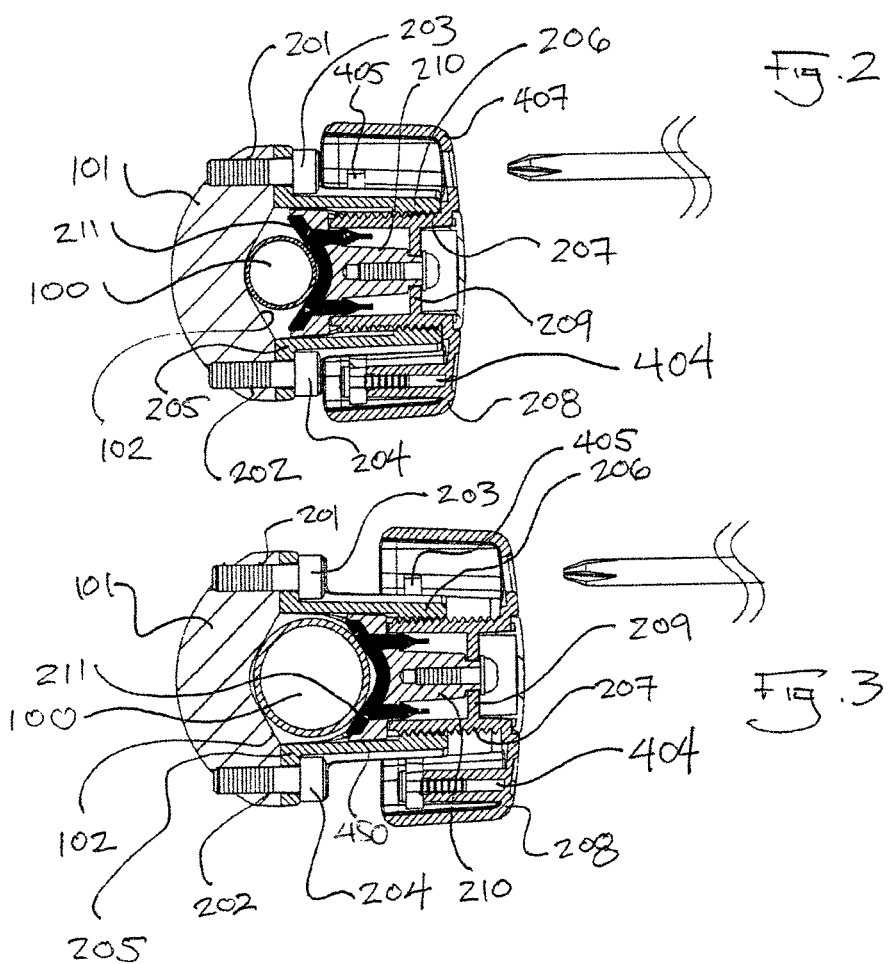

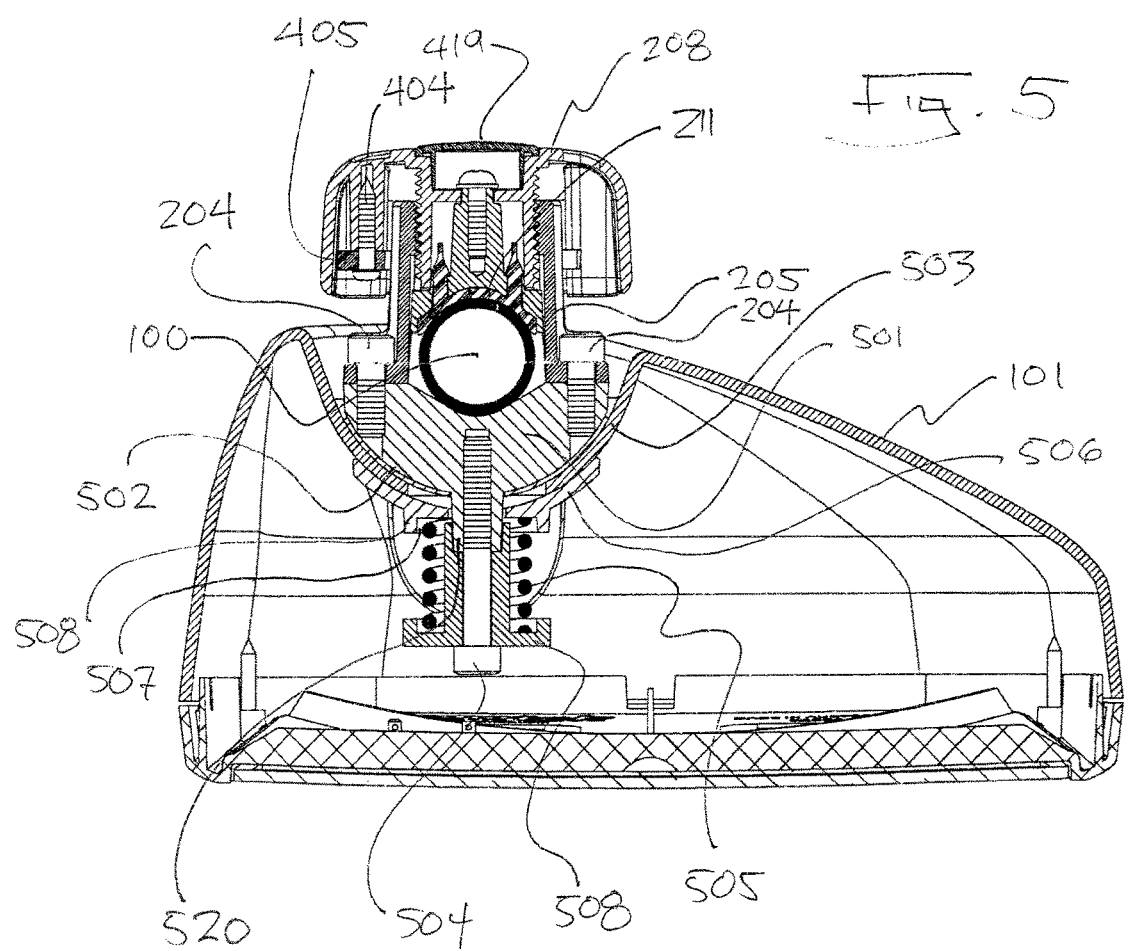

QUICK RELEASE MECHANISM FOR POLE MOUNTED MIRROR

FIELD OF THE INVENTION

The invention relates to automotive mirrors and particularly to a quick release mechanism for a pole mounted mirror.

BACKGROUND OF THE INVENTION

Busses, trucks and other vehicles often mount an exterior rear view mirror on a vertical pole. Replacing a damaged mirror can be difficult, impractical or time consuming.

OBJECTS AND SUMMARY OF THE INVENTION

It is an objection of the invention to provide a mirror having a quick release mechanism.

It is another object of the invention to provide a quick release mechanism for a pole mounted mirror.

BRIEF DESCRIPTION OF THE DRAWING FIGURES

In order that the invention be better understood, reference is now made to the following drawing figures in which:

FIG. 2 is a cross sectional view of the quick release mechanism depicted in FIG. 1.

FIG. 3 is cross sectional view of a quick release mechanism.

FIG. 5 is a cross sectional view of a mirror having a quick release mechanism.

BEST MODE AND OTHER EMBODIMENTS

Figure 1:
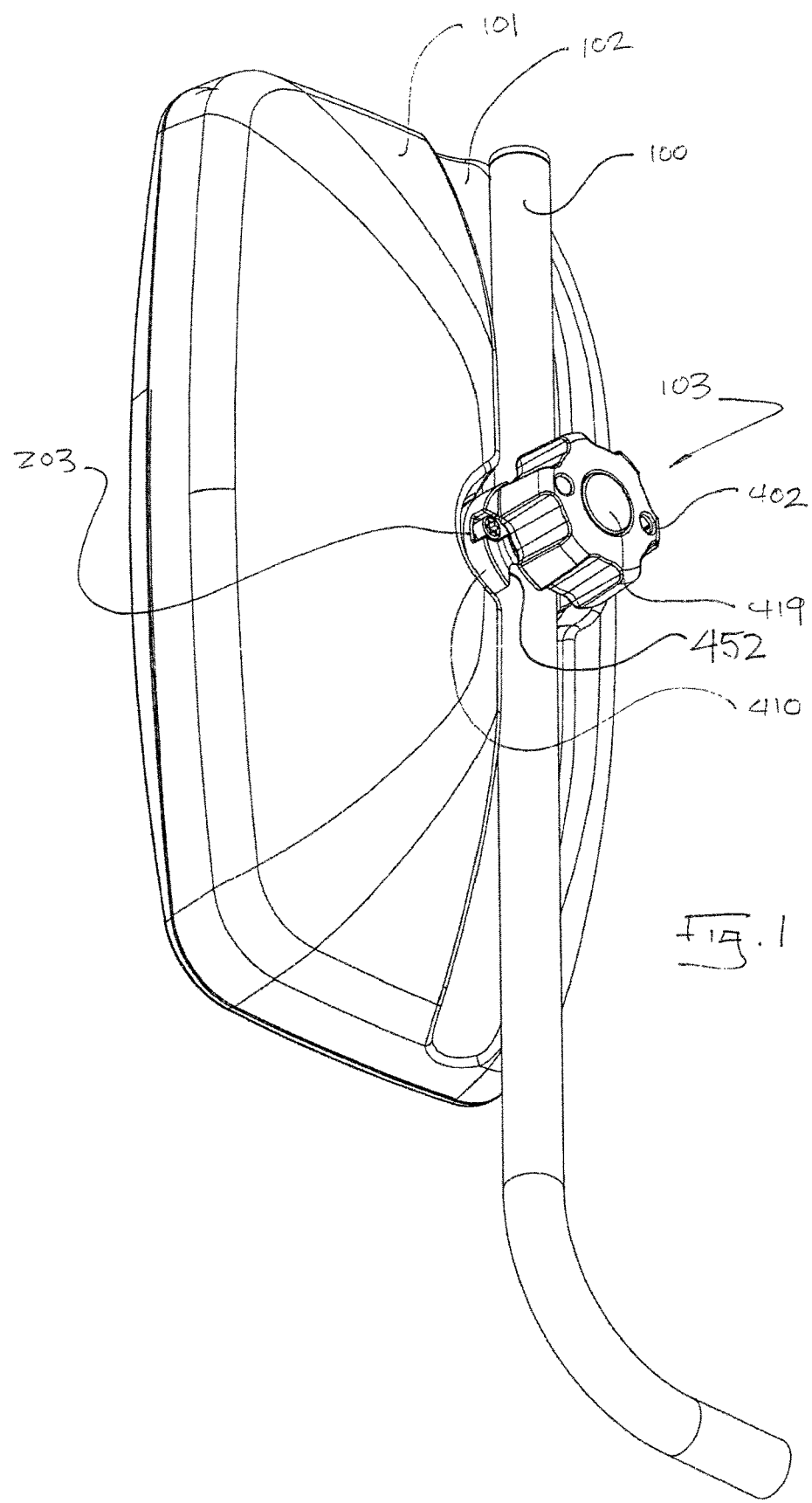
FIG. 1 is a rear perspective view of a pole mounted mirror with a quick release mechanism.

As shown in FIG. 1, vehicles such as trucks and buses have on the exterior a vertical pole 100 to support an exterior rear view mirror 101. In this example, the mirror housing has a vertical grove 102 for accommodating the pole 100. A rotating quick release mechanism 103 couples or clamps the pole 100 against the mirror 101 or a coupling associated with the mirror.

As suggested by FIGS. 1-3, the rear housing portion of the mirror 101 includes a pair of mounting openings 201, 202, for example threaded openings for receiving mounting fasteners 203, 204. The fasteners 203, 204 are used to attach a mounting base 205 to the back of the mirror or a coupling component on the back of the mirror. The mounting base has a mounting flange that supports a cylindrical collar with internal threads 206 that cooperate with external threads formed on a sleeve 207 that is carried by or within a rotating knob or handle 208. A transverse web with a central opening 209 extends across the interior of the sleeve 207. The opening in the web receives and cooperates with a mounting stub 210 that carries an optional polymeric v-shaped or other friction bumper 211. Rotation of the knob or handle moves the stub within the collar. In this way, poles 100 of different diameters can be trapped and clamped against the mirror 101 by rotating the knob 208.

Figure 4:
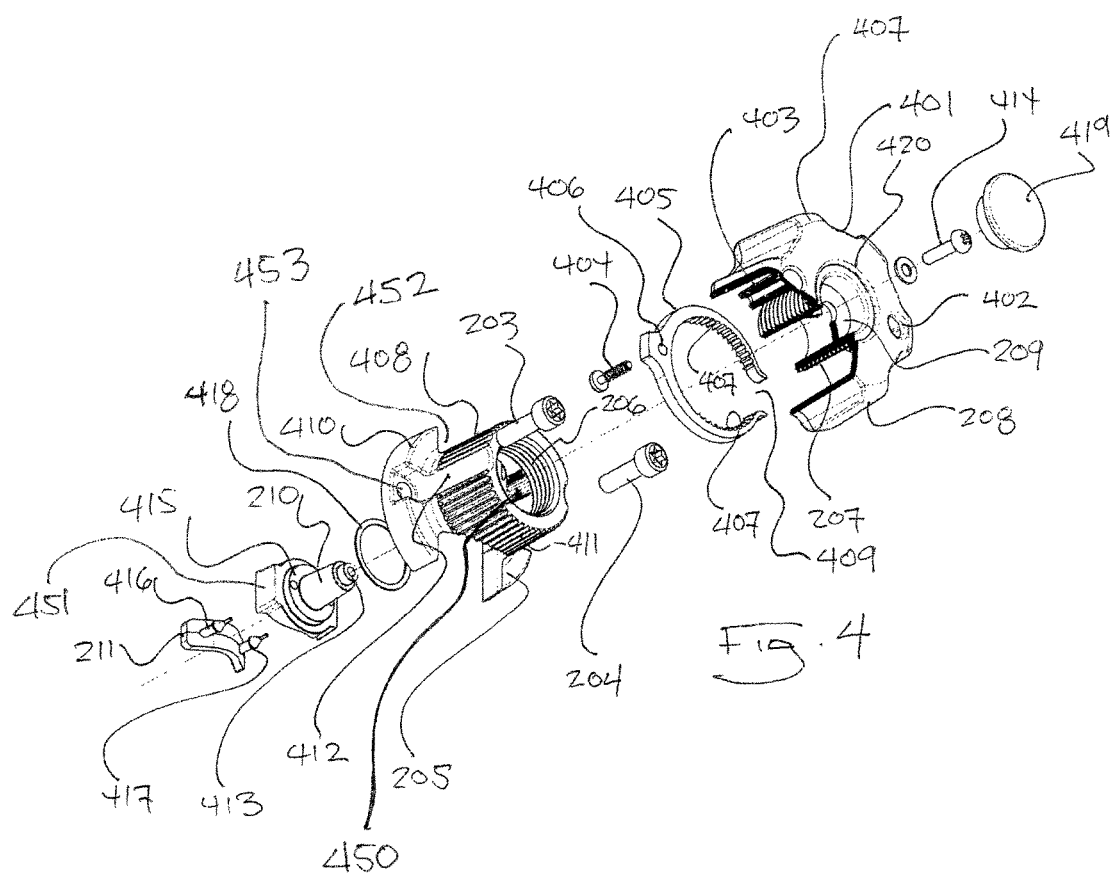
FIG. 4 is exploded perspective view of the quick release mechanism depicted in FIG. 1.

As shown in more detail in FIG. 4, the knob 208 has circumferential grip features 401. The knob 208 has at least one through opening 402 that aligns with at least one of the mounting openings 453 in the base's flange and allows a driver tool (see FIGS. 2 and 3) to access the attachment fasteners 203, 204 when the knob is rotated into correct alignment with either of the fasteners 203, 204.

In preferred embodiments, an underside of the knob 208 has an opening or boss 403 for receiving a fastener 404 that retains a flexible, preferably toothed friction clamp, grip or ring 405. In this example, the friction ring 405 is generally "C" shaped and has a through opening 406 for allowing the fastener 404 to retain the ring within the exterior shell 407 of the knob 208. The friction ring 405 may further comprise an array of longitudinally arranged ribs, teeth or protrusions 407 that releasibly engage cooperating longitudinal ridges or teeth 408 formed on an exterior or collar of the mounting base 205. The friction ring may also have a gap 409, for example opposite the through opening 406. The gap 409 allows a driver or other tool to be inserted into the opening 402 for the purpose of reaching the fasteners 203, 204.

The mounting base 205 has a bifurcated lower mounting flange 410 that supports the cylindrical collar 411. The flange and the lower part of the collar form a transverse notch 452 for receiving a pole. As previously mentioned, the collar is preferably internally threaded 206 to receive the external threads on the knob's sleeve. Vertical or longitudinal access channels 412 that align with each opening 453 provide additional clearance for the driver or tool when accessing the fasteners 203, 204.

The stub 210 has a central opening 413 for receiving the fastener 414 that draws it against the web 209. In this example, the stub 210 has a pair of through openings. The openings receive a pair of spade headed retaining pins 416, 417 integrally formed on the polymeric bumper 211. An anti-friction washer 418 may be interposed between the stub 210 and the underside of the knob's sleeve 207. The stub may have lateral wings 451 that are engaged by one or more internal guide slots 450 in the bore of the sleeve. This prevents the stub from rotating. A cap 419 is removably received by an opening 420 formed on an upper surface of the knob 208. The cap 419 isolates the fastener 414 from environmental contamination.

As shown in FIG. 5, the same or similar the mounting base 205 (as utilised in the examples of 1-4) may be mounted to a mounting coupling 501 utilising the fasteners 203, 204. The coupling has a curved underside or bearing surface 502 whose position can be adjusted relative to the walls of complementary radiused surface, groove, or socket 503 formed on the back of the rear view mirror 101. In this example, the coupling 501 receives a threaded coupling fastener 504 that draws the coupling 501 toward and compresses a compression spring 505. In this example, a curved retainer 506 has a pocket 507 surrounded by a collar 508 that retains the shock-absorbing compression spring. The other end of the spring is retained by a cap 508 through which the fastener 504 passes. The cap engages an extension 520 of the coupling 501. In preferred embodiments, the coupling 501, the retainer 506 and the walls of the socket 503 are radiused. By tightening the fastener 504, the coupling and therefore the quick release mechanism are drawn into engagement with the walls or pocket 503 in the mirror.

Although the invention has been described with reference to specific examples, it will be appreciated by those skilled in the art that the invention may be embodied in many other forms.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope of the invention.

What is claimed is:

1. A quick release device for the attachment of a vehicular mirror to a pole, comprising:
   a mounting base for attachment to the mirror, the base having a collar providing threaded engagement with a rotating knob, the knob carrying a stub that moves within the collar;
   the base having a notch for receiving the pole;
   the stub being disposed to clamp the pole against the mirror;
   wherein the knob carries a friction clamp and the collar has external ribs that cooperate with the clamp;
   wherein the external ribs are formed on the exterior of the collar and cooperate with longitudinally arranged teeth formed on the interior of the clamp that releasably engage the external ribs of the collar, so that the engagement of the longitudinally arranged teeth with the external ribs sufficiently frictionally grips the knob to the mounting base to prevent the unscrewing of the knob from the mounting base.

2. The device of claim 1, wherein:
the base has a flange with mounting openings for receiving mounting fasteners and the knob has a through opening that aligns with at least one of one or more mounting openings provided on the mounting base.

3. The device of claim 1, wherein:
the stub carries a polymeric bumper.

4. The device of claim 1, wherein:
the collar has longitudinal access channels that align with one or more mounting openings provided on the mounting base.

5. The device of claim 1 wherein:
the knob has a web in which is formed a hole that receives a stub fastener, the stub fastener attaching the stub to the knob.

6. The device of claim 1, wherein:
the collar has internal guide slots that cooperate with the stub.

7. The device of claim 1, further comprising:
a coupling that attaches to the base, the coupling having a retainer;
the coupling and retainer adapted to engage a wall of a socket in the mirror;
a coupling fastener extending through a cap that retains a compression spring located between the cap and the retainer.

8. The device of claim 7, wherein:
the coupling, the retainer and the wall of the socket are radiused.

9. A mirror comprising the quick release device of claim 1.

* * * * *